(12) United States Patent
Cuvelier

(10) Patent No.: US 7,002,101 B2
(45) Date of Patent: Feb. 21, 2006

(54) METHOD AND INSTALLATION FOR LASER CUTTING OUT GLASS PIECES

(76) Inventor: Georges Cuvelier, Rue de la Corderie, 21, B-7110 Houdeng-Goegnies (BE)

(*) Notice: Subject to any disclaimer, the term of this patent is extended or adjusted under 35 U.S.C. 154(b) by 112 days.

(21) Appl. No.: 10/415,049

(22) PCT Filed: Oct. 23, 2001

(86) PCT No.: PCT/BE01/00185

§ 371 (c)(1), (2), (4) Date: Apr. 23, 2003

(87) PCT Pub. No.: WO02/34682

PCT Pub. Date: May 2, 2002

(65) Prior Publication Data

US 2004/0016729 A1 Jan. 29, 2004

(30) Foreign Application Priority Data

Oct. 24, 2000 (BE) .......................................... 2000/0676

(51) Int. Cl.
*B23K 26/40* (2006.01)

(52) U.S. Cl. .............................. 219/121.72; 219/121.67
(58) Field of Classification Search ............ 219/121.72, 219/121.76, 121.77, 121.67
See application file for complete search history.

(56) References Cited

U.S. PATENT DOCUMENTS

| 3,519,359 | A | * | 7/1970 | Berg | .......................... 356/401 |
|---|---|---|---|---|---|
| 4,468,534 | A | * | 8/1984 | Boddicker | ............. 219/121.67 |
| 4,910,378 | A | * | 3/1990 | Arai | ....................... 219/121.74 |
| 4,930,901 | A | * | 6/1990 | Johnson et al. | ................ 372/26 |
| 4,973,330 | A | * | 11/1990 | Azema et al. | .................. 606/5 |
| 5,570,384 | A | * | 10/1996 | Nishida et al. | ................ 372/19 |
| 5,854,460 | A | * | 12/1998 | Graf et al. | ............. 219/121.67 |
| 6,211,488 | B1 |  | 4/2001 | Hoekstra et al. | |
| 2002/0170896 | A1 | * | 11/2002 | Choo et al. | ............ 219/121.72 |

FOREIGN PATENT DOCUMENTS

| BE | 670504 | | 10/1965 | |
| DE | 44 11 037 A1 | | 10/1994 | |
| JP | 60-251138 A | * | 12/1985 | |
| JP | 5-69170 A | * | 3/1993 | ............ 219/121.76 |
| JP | 8-47791 A | * | 8/1994 | |
| JP | 6-304773 A | * | 11/1994 | ............ 219/121.67 |
| JP | 8-25074 A | * | 1/1996 | |
| WO | WO 98/56722 | | 12/1998 | |

* cited by examiner

*Primary Examiner*—Geoffrey S. Evans
(74) *Attorney, Agent, or Firm*—Pillsbury Winthrop LLP

(57) ABSTRACT

Method of cutting a glass piece along a predetermined cutting line. One and the same beam of laser rays, focused by a focusing device, travels along the predetermined cutting line during at least one marking step and during at least one heating step, the focusing device being an adjustable focusing device which, during a marking step, focuses the beam of laser rays substantially on the predetermined cutting line and which, during a heating step, ensures that the focal point of the beam is appreciably distant from the predetermined cutting line.

36 Claims, 4 Drawing Sheets

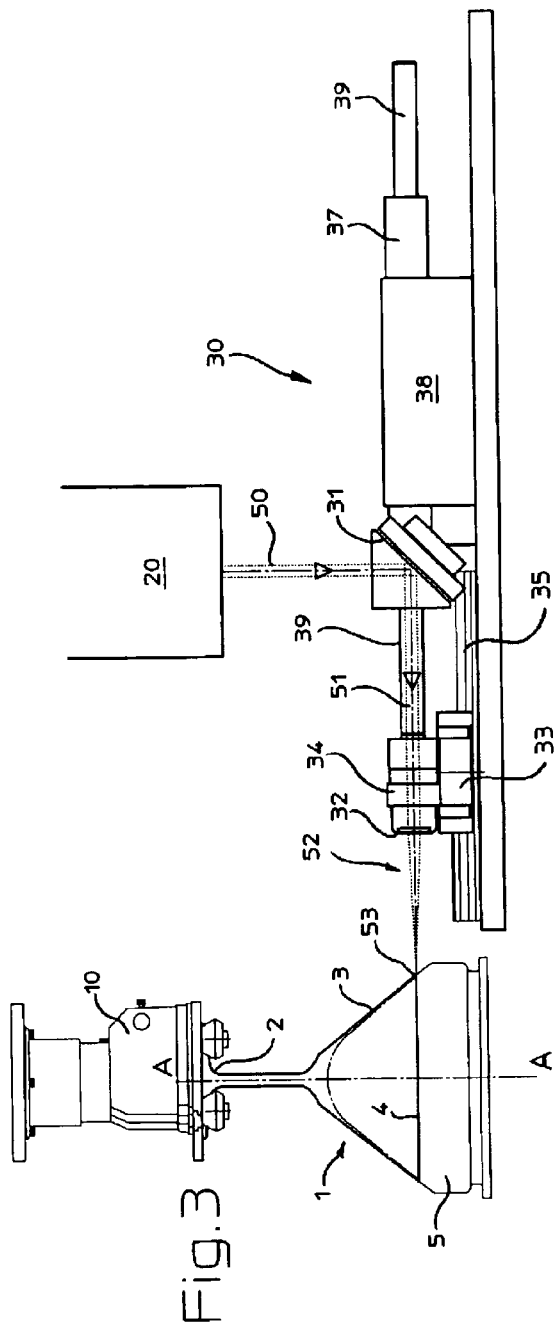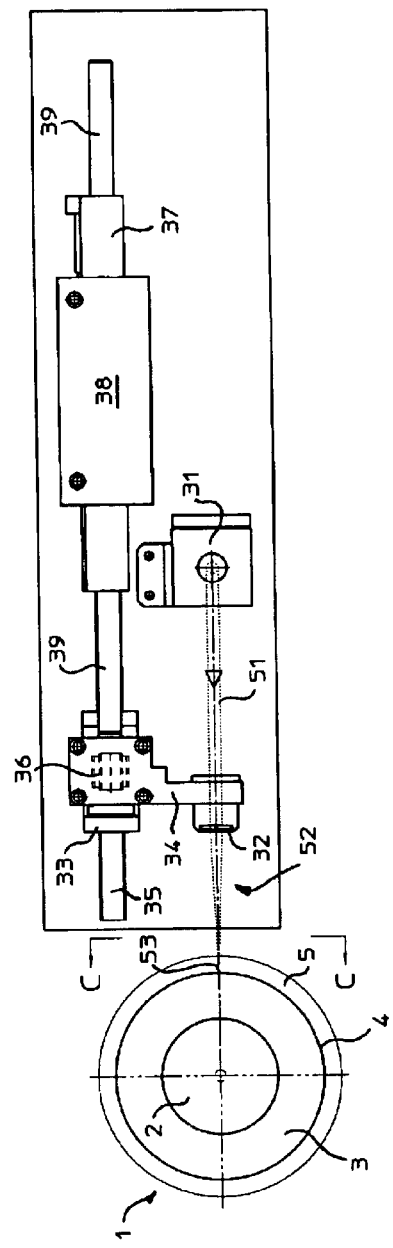

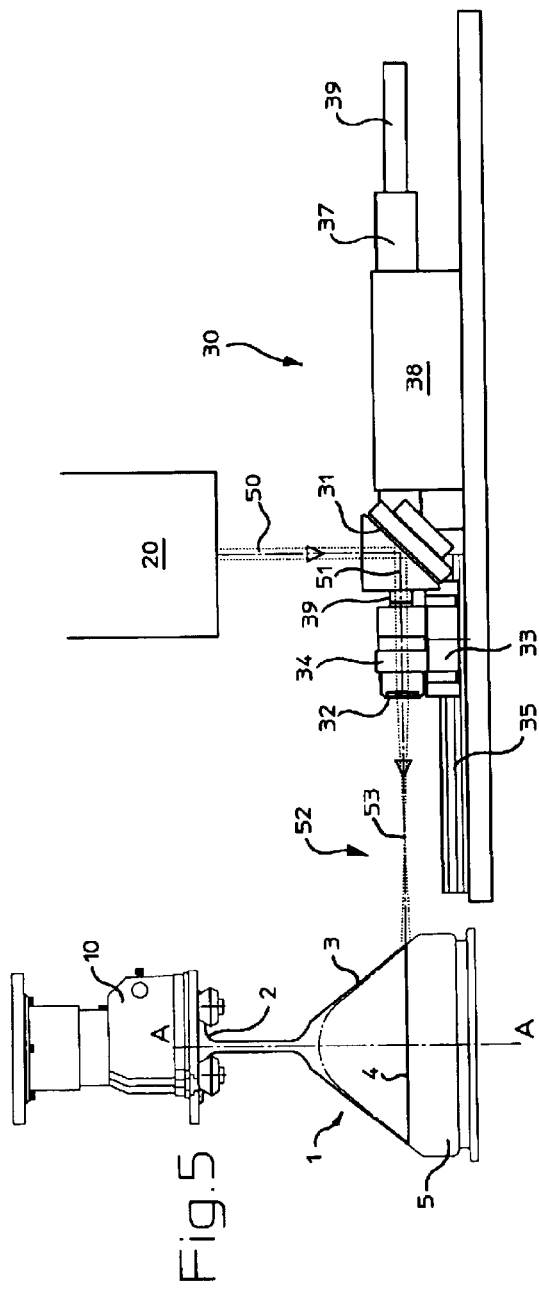
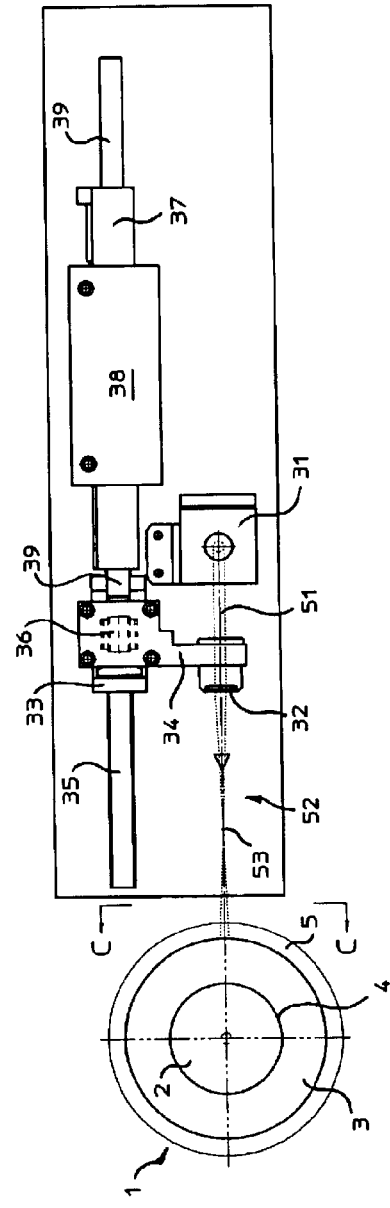
Fig.5
Fig.6

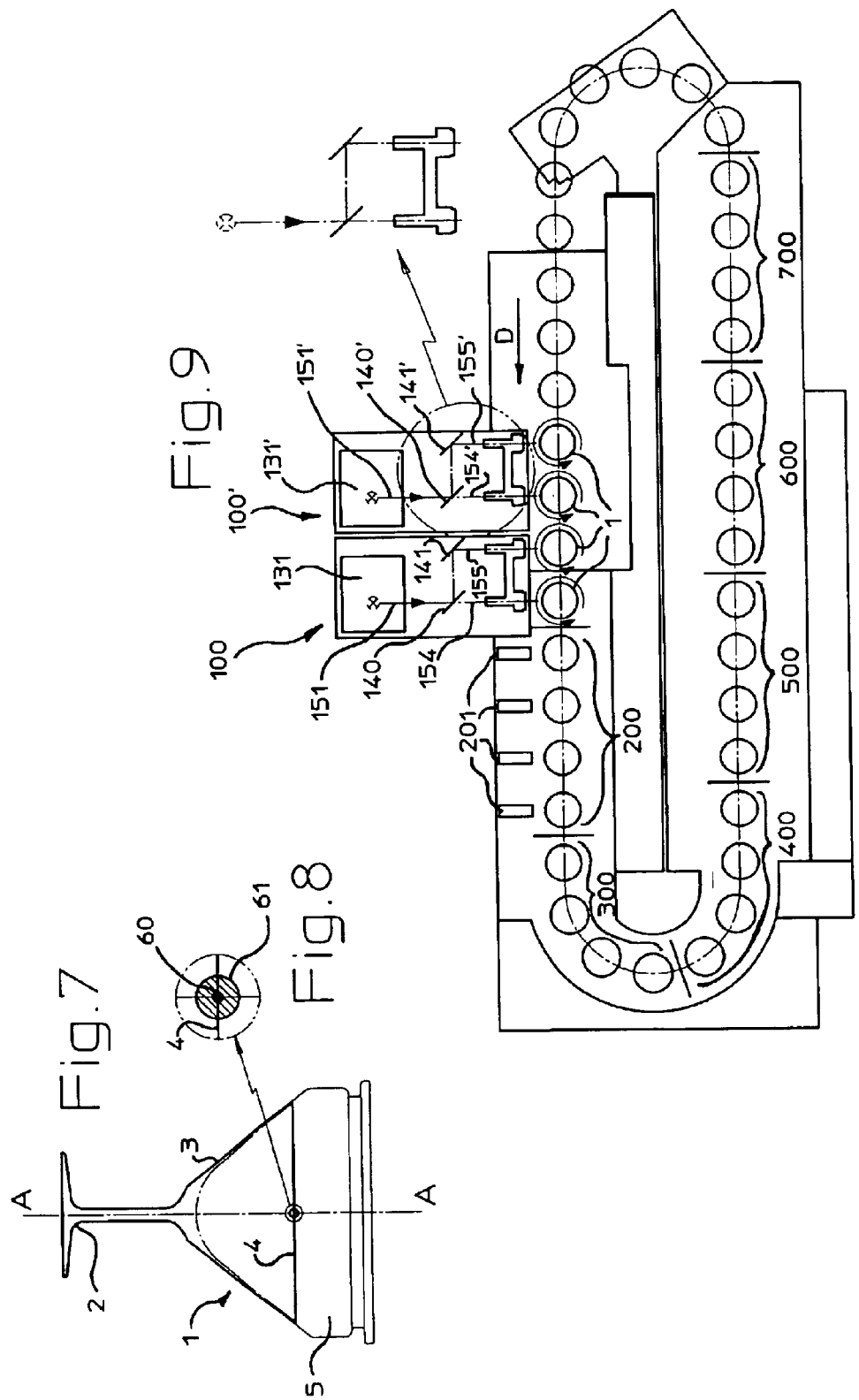

METHOD AND INSTALLATION FOR LASER CUTTING OUT GLASS PIECES

This application is the National Phase of International Application PCT/BE01/00185 filed 23 Oct. 2001 which designated the U.S. and that International Application was not published under PCT Article 21(2) in English.

BACKGROUND

The inventions described herein relate generally to methods and installations for cutting glass pieces.

The methods and installations can be used both in the flat glass industry and in the hollow glass industry but will be described in more detail for their application to hollow glass.

The manufacture of objects in hollow glass such as drinking glasses, vases etc generally includes an operation known as "cracking-off".

Cracking-off is an operation by means of which there is separated, from the glass part constituting the final glass piece proper, a mass of glass which does not constitute the final glass piece proper but which results from the hot forming process; this is in general the part by which there was held the mass of glass initially intended to constitute the piece of glass during the pressing or blowing operations which were performed when the glass was in the viscous state in order to give it the required shape corresponding to that of the glass piece. This part of the glass piece not constituting the final article proper is in general referred to as "moil".

Cracking-off can be carried out by a hot method or a cold method.

During hot cracking-off, the glass is raised, in the vicinity of the area where the cracking-off is to occur, to a temperature greater than the softening point, where it becomes malleable: separation occurs by sufficiently moving apart the two parts of glass to be separated, when the two masses of glass separate, the surface tensions act in order to form a thick rounded edge. This method is in general reserved for lower-quality articles.

During cold cracking-off, the glass is raised, in the vicinity of the area where the cracking-off is to occur, to a temperature below that of the case of hot cracking-off; the glass remains in the fragile range and the purpose of this heating is merely to introduce mechanical tensions which, in being released, for example under the effect of contact with a cold metallic object or under the effect of a cold air jet, will cause a crack which, propagating in the fragile material, will cause cracking-off. In the case of cold cracking-off, it is frequent for the method used to include a marking stage whose purpose is to generate, on the surface of the glass article, through the mechanical action of a tool which is harder than glass, a surface defect which can be assimilated to a scratch, and which will serve to guide the propagation of the crack when it occurs abruptly. The result of this method is a thin but sharp edge which, in order to have the properties necessary to the finished glass piece, will have to undergo various polishing operations by means of abrasive tools, in general referred to as flatting, bevelling, flame polishing, and even toughening in order to give it sufficient mechanical strength. The final result is a thin and sufficiently strong edge. The cold cracking-off operation is more complex to perform than hot cracking-off and is reserved for higher-quality glass pieces.

The flatting operation is described notably in the document BE 670 504.

The optimum performance of the cold cracking-off operation makes it possible to obtain an edge as close as possible to its final form, having as few defects as possible so that the flatting operation is carried out easily, without requiring removal of a great deal of material.

The cold cracking-off operation by means of the conventional methods does not always give good results or gives results which are insufficiently reproducible on glass pieces having particular shapes, such as for example splayed glasses or glasses which are substantially cylindrical but have a polygonal cross-section. The mechanical appliances used for effecting marking by means of diamond tip, or a carbide or ceramic tip or wheel, must allow a multitude of adjustments in order to be able to adapt to the different geometries of the glasses to be processed, and in all cases they require regular maintenance and the intervention, at each change of production, of specialist staff.

For some time, methods resembling the cold cracking-off method, using one or more beams of laser rays for heating the material and generating therein the necessary defect equivalent to the grid of the tool, have been proposed.

Through the patent application WO98/56722, a method of cracking-off glass pieces is known, this method comprising two successive steps:

in a first step, a piece to be cracked-off under rotation is subjected to the action of a continuous beam of laser rays or to continuous beams of laser rays;

in a second step, for substantially one rotation of the piece to be cracked-off or for at least one rotation of the piece to be cracked-off, the area which was in the first step subjected to the action of one or more continuous beams of laser rays is subjected to the action of at least one pulsed beam of laser rays focused so as to form a series of successive points distant from each other, the series defining a substantially continuous line along which the cracking-off substantially takes place.

The result is a very even, almost plane cracked-off edge, except for irregularities of small magnitude, easily able to be eliminated by light flatting, inexpensive and easy to perform; the method makes it possible to obtain this even edge in a highly reproducible fashion. In addition, for certain glass pieces, in particular for pieces of simple shape, for example cylindrical or substantially cylindrical, and for glass pieces with a wall thickness generally less than 2 mm, this method makes it possible to obtain a cracked-off edge able to be processed directly in a flame-polishing station, without having to be previously flatted.

The main drawback of the method described in the patent application WO98/56722 is requiring the use of at least two distinct beams of laser rays, of different natures: a continuous beam of laser rays and a pulsed beam of laser rays, which complicates the installation implementing the method and increases its installation and operating cost.

SUMMARY

The inventions described herein provide methods and installations which, while having the operational advantages of the technique described in WO98/56722, remedy these drawbacks and also provide additional advantages and possibilities in application.

The inventions provide methods of processing a glass piece so as to cut the piece along a predetermined cutting line on its surface, the methods including:

at least marking step, during which a beam of laser rays focused by a focusing means travels along the predetermined cutting line, the beam being substantially focused on the predetermined cutting line, and at least one heating step, during which a beam of laser rays travels along the predetermined cutting line without being focused on this line, the portion of the surface irradiated by the laser beam straddling the predetermined cutting line.

The same beam of laser rays travels along the predetermined cutting line during a marking step and during a heating step, the focusing means being an adjustable focusing means which, during a marking step, focuses the beam of laser rays substantially on the predetermined cutting line and which, during a heating step, ensures that the focal point of the beam is appreciably distant from the predetermined cutting line.

It is important to note that if, in the method according to the invention, the beam of laser rays travels along the predetermined cutting line, this entails a relative movement between the piece to be processed and the laser ray, which can be achieved by a movement of the piece to be processed and/or a movement of the laser ray.

According to one embodiment, the method according to the invention is such that, during a marking step, the focused beam of laser rays travels along the predetermined cutting line because the glass piece is moved so that at any time the predetermined cutting line substantially coincides with the focal point of the laser beam and in that, during a heating step, the beam of laser rays travels along the predetermined cutting line, because the glass piece is moved so that at any time the portion of surface irradiated by the beam straddles the predetermined cutting line.

The means of focusing the beam of laser rays can notably consist of a convergent lens. In this case, the focusing of the beam can notably be adjusted by a movement of the lens along the axis of the beam.

According to one advantageous embodiment, this movement of the lens along the axis of the beam is caused and controlled by the movement of the axis of a linear electric motor.

The beam of laser rays projected onto the surface of the glass piece during a marking step can be a pulsed beam of laser rays.

As indicated above, the beam of laser rays is, during a marking step, substantially focused on the predetermined cutting line on the surface of the piece. It is important to understand thereby that, during the marking step, the focal point of the beam, which corresponds to the place where the beam is physically the narrowest and where the power of the ray is the most concentrated, is situated on the surface of the piece or only at a short distance (for example a few millimeters) on this side of or beyond this surface. It is important that, at the point of impact of the focused beam with the surface of the glass piece, the irradiated surface is very small (with a diameter less than 500 $\mu$m, for example, or even less than 100 $\mu$m).

The beam of laser rays projected onto the surface of the glass piece during a marking step can be a pulsed beam of laser rays.

In this case, the pulsed beam of laser rays produces on the surface of the glass piece a succession of impact zones having a diameter of less than 500 $\mu$m separated from each other by a distance of less than 2 mm.

The diameter of these impact zones will for example be less than 100 $\mu$m and even less than 50 $\mu$m.

The impact zones are preferably separated from each other by a distance of less than 1 mm. This distance will, for example, be between 100 and 800 $\mu$m.

The physical characteristics of the pulsed beam of laser rays are advantageously such that the impact zones are subjected to the action of the beam with a radiation density which is sufficiently high for point defects, coinciding substantially with the predetermined cutting line, to appear on the surface of the glass piece.

The word "point" can obviously not be understood here in a strict geometric sense, the point defects being generally small craters whose diameter is generally less than 500 $\mu$m or even less than 50 $\mu$m.

The beam of laser rays projected onto the surface of the glass piece during a marking step can however also be a continuous beam of laser rays.

In this case, the continuous beam of laser rays projected onto the surface of the glass piece during this marking step produces on the surface of the glass piece a continuous impact line with a width of less than 500 $\mu$m. This continuous line has, for example, a width of less than 100 $\mu$m or even less than 50 $\mu$m.

In particular, the physical characteristics of the continuous beam of laser rays projected onto the surface of the glass piece during a marking step are such that the continuous impact line is irradiated with a density of irradiation which is sufficiently high for a crack, coinciding substantially with the predetermined cutting line, to appear on the surface of the glass piece.

The beam of laser rays projected onto the surface of the glass piece during a heating step can be a pulsed or continuous beam of laser rays.

This beam produces on the surface of the glass piece an impact line with a width of between 2 mm and 10 mm. This line will for example have a width of approximately 3 or 4 mm.

During a heating step, the physical characteristics of the beam of laser rays and the irradiation conditions are such that the portion of surface irradiated is subjected to a density of irradiation such that the geometry of this surface is not altered but the heating of the irradiated zone creates mechanical stresses in the mass of glass in this zone.

The method according to the invention comprises at least one marking step and at least one heating step.

However, various processing cycles can be applied.

Thus a processing cycle can notably include:

a marking step followed by a heating step, or successively a marking step, a heating step and a marking step, or a heating step followed by a marking step, or successively a heating step, a marking step and a heating step.

The method according to the invention is suitable for the cutting of glass pieces which are very diverse, with regard to both their composition and their shape.

These pieces can notably be made from "ordinary" glass (soda-lime-silica glass, for example) or glass with a high lead content (crystal).

The piece can be a piece of flat glass or a piece of hollow glass.

In the case of pieces of hollow glass such as drinking glasses (with or without a stem), vases etc, the predetermined cutting line generally forms a closed curve.

This closed curve is generally situated in one plane. In this case, the piece of hollow glass is rotated about an axis perpendicular to this plane, during at least one heating step and at least one marking step.

The method according to the invention has notably proved to be highly advantageous for the cracking-off of pieces of hollow glass, and this not only for pieces which are cylindrical in shape, but also for pieces of glass with a splayed profile or a re-entrant profile. The thickness of the glass piece, at the point of cracking-off, may possibly be less than 1 mm, but this thickness may also be appreciably greater, ranging for example up to 5 mm, or even beyond 5 mm.

The method makes it possible to obtain a very regular cracked-off edge, almost flat, except for irregularities of small magnitude, easily able to be eliminated by light flatting, inexpensive and easy to perform; the method makes it possible to obtain this even edge in highly reproducible fashion. In addition, for certain glass pieces, in particular for pieces with a simple shape, for example cylindrical or substantially cylindrical, and for glass pieces where the thickness of the wall is generally less than 2 mm, this method makes it possible to obtain a cracked-off edge able to be processed directly by a flame-polishing station, without previously having to be flatted.

It was specified above that the beam of laser rays projected onto the surface of the glass piece during a marking step can be a pulsed or continuous beam of laser rays. The beam of laser rays projected onto the surface during a heating step can also be a pulsed or continuous beam.

The type of beam applied for the heating can possibly be different from the type of beam for marking: for example, a continuous beam for heating and a pulsed beam for marking.

The type of beam applied can however be the same for heating and for marking. It has thus been possible to observe that, for the majority of applications, very good results are obtained by applying the same beam of laser rays, pulsed at the same frequency, for a marking step and for a heating step, only the position of the focal point of the beam being modified during the change from one step to the following.

It should be understood that it is a question here of the type of beam of laser rays projected onto the surface of the glass piece to be treated and not the type of laser source.

This is because, using a laser source of the continuous type, it is certainly possible to project a continuous laser beam onto the piece to be processed.

However, using a laser source of the continuous type, it is also possible, by electronic chopping, to obtain a pulsed beam which can then be projected onto the piece to be processed.

Likewise, by using a laser source of the pulsed type, it is certainly possible to project a pulsed laser beam onto the piece to be processed.

However, using a laser source of the pulsed type, it is also possible to obtain a "pseudocontinuous" laser beam by increasing the frequency of pulsation and the cycle ratio, that is to say the ratio between the duration of emission at high energy during a cycle and the duration of the complete cycle. Such a "pseudocontinuous" laser beam in which the emission energy oscillates slightly around an energy level is to be considered to be a continuous laser beam, in the context of the present invention.

Another object of the present invention is an installation for the processing of a piece of glass with a view to cutting the piece along a predetermined cutting line on the surface of the piece,
the installation including:
 a source for a beam of laser rays,
 a system for guiding the beam including a focusing means, and
 a control station,
the installation being able to project onto the surface of the piece:
in at least one step, referred to as the marking step, a beam of laser rays travelling along the predetermined cutting line, the beam of laser rays being substantially focused on the predetermined cutting line by the focusing means,
in at least one step, referred to as the heating step, a beam of laser rays travelling along the predetermined cutting line, the beam of laser rays not being focused on the cutting line, the portion of the surface irradiated by the beam of laser rays straddling the cutting line.

In the installation according to the invention, the focusing means is an adjustable focusing means able to focus a beam of laser rays emitted by the source of laser rays onto the predetermined cutting line, during a marking step, and able to ensure that the focal point of the same beam of laser rays projected onto the predetermined cutting line is appreciably distant from this line during a heating stage.

In the installation according to the invention, the focusing means can, in particular, be a convergent lens for lasers.

The focusing means can notably be a movable focusing means, having during a marking step a position such that the beam of laser rays is focused on the predetermined cutting line and having during a marking step a position such that the focal point of the beam of laser rays is appreciably distant from the predetermined cutting line.

The beam guidance system can include a carriage on which the focusing means is mounted.

According to one embodiment of the installation, the carriage is able to move the focusing means along the axis of the beam of laser rays.

According to a particular embodiment, the installation includes a linear electric motor able to move the carriage.

The focusing means is advantageously adjusted by an automated control station.

According to one advantageous embodiment of the installation, the focusing means is a movable focusing means, having during a marking step a position such that the beam of laser rays is focused on the predetermined cutting line and having during a marking step a position such that the focal point of the beam of laser rays is appreciably distant from the predetermined cutting line, the control station adjusting the position of the focusing means.

In this case, the guidance system can include a carriage on which the focusing means is mounted, the control station being able to adjust the position of the focusing means by controlling the movement of the carriage.

The control station can notably be able to control the movement of the carriage in a direction parallel to the beam of laser rays.

The installation can include a system for detecting the position of the predetermined cutting line on the surface of the glass object, the control station then being able to adjust the position of the focusing means according to the detected position of the predetermined cutting line.

Advantageously, the installation includes a modulation device able to adjust the frequency and the pulsation mode of the beam of laser rays.

This modulation device can be controlled by the control station. This modulation device makes it possible to adjust the frequency and the pulsation mode (notably the cycle ratio) of the beam of laser rays projected onto the glass object to be processed, and this both during a marking step and during a heating step.

In an installation according to the invention, the guidance system can include at least one mirror for lasers, able to modify the direction of the beam of laser rays. This guidance system can include at least one mirror for lasers with an adjustable position and/or orientation.

In this case, the control station can be able to adjust the direction of the beam of laser rays by controlling the change in position and/or orientation of at least one mirror for lasers.

When, in such a case, the installation also includes a system detecting the position of the predetermined cutting line, the control station can be able to adjust the position and/or the orientation of at least one mirror for lasers, according to the detected position of the predetermined cutting line.

An installation according to the invention generally has at least one device able to hold the glass piece to be processed. This device can be a movable device able to move the glass piece and, in particular, it can be able to move the glass piece in a plane perpendicular to the axis of the beam of laser rays.

More particularly, the device can be able to rotate the glass piece, notably about an axis perpendicular to the axis of the beam of laser rays projected onto the piece.

An installation according to the invention can include a multitude of devices able to hold, move and possibly rotate a multitude of glass pieces to be processed.

In such a case, the installation can include a device for the stepping translation of the devices able to hold the glass pieces.

The installation can, in particular, include devices able to hold, rotate and drive in a stepping fashion pieces of hollow glass.

The devices able to hold, move and possibly to rotate the pieces of glass to be processed can be controlled by the control station.

The source for a beam of laser rays with which the installation is equipped can be a source with adjustable power. This source can also be a source with an adjustable position and/or orientation.

In these cases, the control station can be able to adjust the power and/or the position and/or the orientation of the laser source.

According to a particular embodiment of the installation, the guidance system includes at least one deflector dividing a beam of laser rays into two or more beams of diverted laser rays. Each of these diverted laser rays can then be used for processing a glass article according to the method according to the invention and by means of an installation as described above.

BRIEF DESCRIPTION OF THE DRAWINGS

Other particularities and advantages of the invention will emerge from the description of three example embodiments of the method according to the invention and from the description, given below by way of non-limitative example, of an embodiment of the installation according to the invention, reference being made to the accompanying drawings, in which:

FIGS. 3 and 4 are respectively an elevation view and a plan view showing part of the installation according to the invention and a glass piece processed by this installation during a marking step;

FIGS. 5 and 6 are views similar to FIGS. 3 and 4 but relating to the heating step;

FIG. 7 is a view of the processed glass piece, seen in the direction of the arrows C—C in FIGS. 4 and 6;

FIG. 8 is an enlarged schematic view of a detail of FIG. 7, and

FIG. 9 is a schematic plan view of an installation according to the invention.

DETAILED DESCRIPTION

Figure 1:
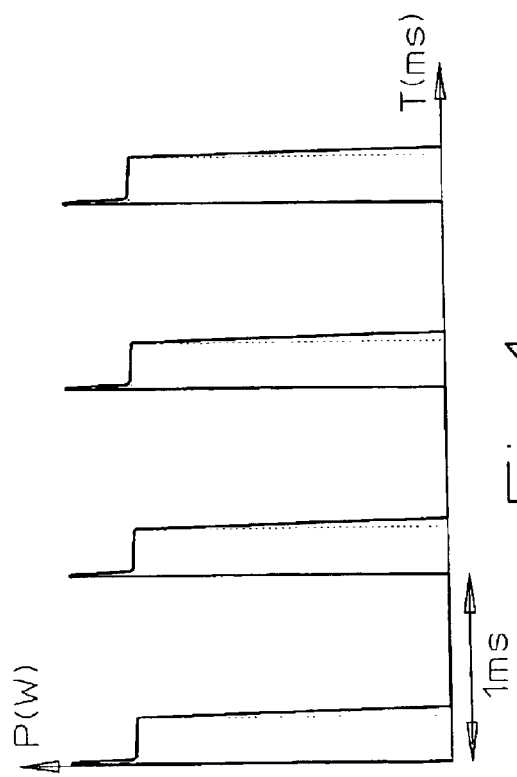

The graph shown in FIG. 1 shows the emission power as a function of time, of a pulsed beam of laser rays. It can be seen that, with this mode of modulation of the beam, emission power peaks are clearly separated by spaces in time where the emission power is zero.

The frequency of the emission cycles, just like the cycle ratio, that is to say the ratio between the duration of emission at high energy and the total emission cycle duration, and the power of the laser during its period of emission at high energy, are parameters which can be controlled and adapted according to the circumstances of use.

Figure 2:
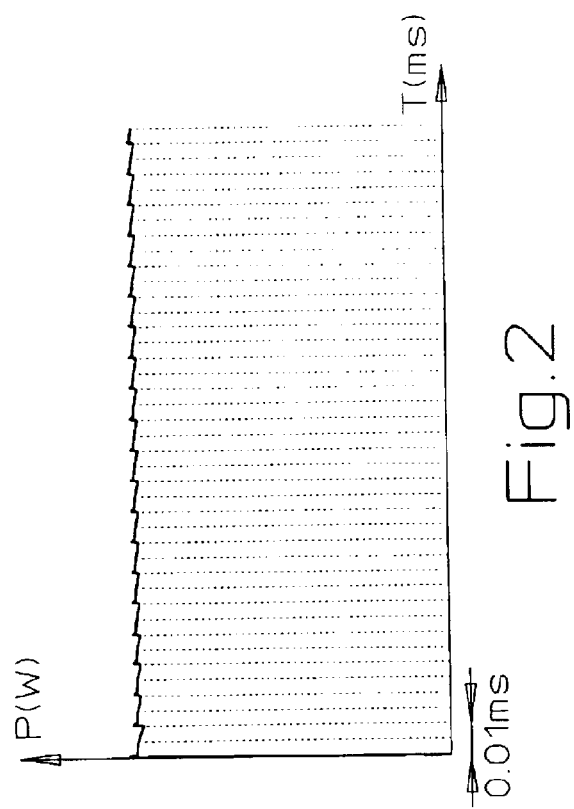
FIGS. 1 and 2 are two graphs (emission power as a function of time) of a pulsed beam of laser rays, modulated according to two different modes.

By increasing the frequency and the cycle ratio of a pulsed laser beam, it is possible to obtain a pseudocontinuous laser beam, as shown by the graph in FIG. 2. In this case, the emission power oscillates (with a low amplitude) about a given power value.

According to the embodiment of the invention illustrated in FIGS. 3 to 6, the glass piece 1 to be processed is a hollow body of revolution having a stem 2 and a splayed part 3.

The predetermined cutting line 4 forms a closed curve on the external surface of the glass piece 1. The predetermined cutting line 4 is situated in a plane perpendicular to the axis of symmetry A—A of the piece 1.

The glass piece 1 is held by its base 2 in a rotary chuck 10. The base 2 of the glass piece 1 is turned upwards, the splayed part 2 downwards.

The rotary chuck 4 forms part of a drive device, not shown.

The glass piece 1 is rotated about its axis of symmetry A—A.

The glass piece 1 is processed by means of an installation comprising a source for a beam of laser rays 20 and a guidance system 30 for a beam of laser rays 50.

The guidance system 30 has a mirror 31 for laser rays and a focusing means 32 for laser rays.

The source of the beam of laser rays 20 emits a beam of laser rays 50 directed downwards.

The beam of laser rays 50 strikes the mirror 31. The mirror 31 is oriented so that the reflected beam of laser rays 51 is directed towards the glass piece 1 to be processed.

The axis of the reflected beam of laser rays 51 is situated in the plane of the cutting line 4 and passes through the axis of symmetry and rotation A—A of the glass piece 1. The axis of the reflected beam of laser rays 51 is therefore perpendicular to the axis of symmetry and rotation A—A.

Before being projected onto the glass piece 1, the reflected beam of laser rays 51 passes through the focusing means 32.

The focusing means 32 is a convergent lens for lasers.

The lens 32 is oriented so that it does not change the orientation of the axis of the beam of laser rays.

The axis of the focused beam of laser rays 52 emerging from the focusing means 32 therefore coincides with the axis of the beam of laser rays 51 reflected by the mirror 31.

The focusing means 32 is mounted on a carriage 33 by means of a support 34.

The carriage 33 slides on a rail 35.

The focusing means 32 is an adjustable focusing means because a movement of the carriage 33 and therefore of the lens 32 makes it possible to adjust the position of the focal point 53 of the focused beam of laser rays 52.

The carriage 33 slides without clearance on the rail 35 by means of a prestressed system with recirculation of balls integrated into the carriage 33.

The support 34 for the focusing means 32 is connected by an elastic coupling 36 to the shaft 39 of a linear motor 37 mounted on a support 38.

The mirror 31, the focusing means 32, the carriage 33 and the support 34, the rail 35, the elastic coupling 36 and the motor 37 and its shaft 39 all form part of the guidance system 30.

The direction of movement of the axis 39 of the linear motor 37 is parallel to the axis of the rail 35 which is, in its turn, parallel to the axes of the reflected beam of laser rays 51 and of the focused beam of laser rays 52.

The elastic coupling 36 enables the support 34 for the focusing means 32 to slide without stray lateral stress on the rail 35 by means of the carriage 33.

The position of the carriage 33, of the support 34 and of the focusing means 32 on the rail 35 is determined by the position of the axis 39 of the linear motor 37.

The position of the axis 39 of the linear motor is adjusted by the electronic adjustment system, not shown, for the linear motor 37.

The electronic adjustment system is controlled by the control station, not shown, of the installation.

The control station determines the position, the speed of movement and the acceleration of movement of the axis 39 of the linear motor 37.

The method according to the invention comprises at least one marking step and at least one heating step.

FIGS. 3 and 4 illustrate the functioning of the installation during a marking step.

During a marking step, the electronic adjustment system for the linear motor 37 receives, from the control station, the instruction to position the axis 39 of the linear motor 37 and therefore the focusing means 32 so that the focal point 53 of the focused beam of laser rays 52 coincides substantially with the predetermined cutting line 4 on the surface of the glass piece 1.

The portion 60 of the surface of the glass piece 1 irradiated at a given moment during a marking step is shown in FIGS. 7 and 8. This portion 60 corresponds to a point situated on the predetermined cutting line 4, this portion 60 having a diameter less than 0.5 mm, typically approximately 0.1 mm.

Because the rotary chuck 10 keeps the glass piece 1 in rotation about its axis of symmetry A—A, the beam of laser rays 52 focused on the predetermined cutting line 4 travels over the whole of this line 4 in one rotation of the glass piece 1.

The speed of rotation of the glass piece 1 is typically around 100 to 500 rev/min.

FIGS. 5 and 6 illustrate the functioning of the installation during a heating step.

During a heating step, the electronic adjustment system for the linear motor 37 receives, from the control station, the instruction to position the axis 39 of the linear motor 37 and therefore the focusing means 32 so that the focal point 53 of the focused beam of laser rays 52 is appreciably distant from the predetermined cutting line 4 on the surface of the glass piece 1. The distance between the intersection of the focused beam of laser rays 52 with the cutting line and the focal point 53 of the focused beam of laser rays 52 is typically around 20 to 150 mm.

The portion 61 of the surface of the glass piece 1 irradiated at a given moment during a heating step is also shown in FIGS. 7 and 8. This portion 61 irradiated during a heating step is appreciably greater than a portion 60 irradiated during a marking step.

The portion 61 irradiated during a heating step corresponds to a zone straddling the predetermined cutting line 4 whose diameter is typically around 228 mm.

Because the rotary chuck 10 keeps the glass piece 1 in rotation about its axis of symmetry A—A, the focused beam of laser rays 52, whose focal point 53 is distant from the predetermined cutting line 4, travels over the whole of this cutting line 4 in one rotation of the glass piece 1.

After one or more marking steps and one or more heating steps, the effects of the different steps combine so as to cause the separation of the part 5 on the glass piece 1 essentially along the predetermined cutting line 4.

The part 5 of the glass piece, situated below the predetermined cutting line 4 (when the glass piece is held by the rotary chuck 10) is referred to by the technical term "moil".

The processing method illustrated in FIGS. 3 to 6 is therefore a method of cracking-off a glass piece.

The installation for processing glass pieces illustrated in FIG. 9 is an installation according to the invention including:

two marking and heating stations 100, 100',
a cooling station 200,
a flatting station 300,
a bevelling station 400,
a washing and draining station 500, and
a flame-polishing station 600.

The installation according to FIG. 9 is adapted for the simultaneous processing of four glass pieces by means of a method as defined in claim 1.

The glass pieces 1 are hollow bodies of revolution. Each of the glass pieces 1 is held by a rotary chuck keeping the glass piece 1 in rotation about its axis of symmetry.

The predetermined cutting line for the glass pieces is situated in a plane perpendicular to the axis of symmetry.

The rotary chucks form part of a stepper drive system.

The rotary chucks are attached to a closed conveyor belt moving stepwise in the direction D. Per step, the conveyor belt moves over a distance corresponding to a section of the belt having four rotary chucks.

The drive system thus successively brings four glass pieces 1 in front of the two marking and heating stations 100, 100'. Each of the two marking and heating stations 100, 100' simultaneously processes two glass pieces 1.

The heating and marking stations 100, 100' are distinguished from the marking and heating station illustrated in FIGS. 1 to 6 in that they have a deflector 140, 140' dividing the reflected beam of laser rays 151, 151' by means of the mirror for laser rays 131, 131' into two deflected beams of laser rays 154, 154' and 155, 155'.

The guidance system for the two marking and heating stations also has means 140, 140' and 141, 141' each able to direct two beams of laser rays 154, 154' and 155, 155' towards a glass piece 1 so that the axis of the beams of laser rays is situated in the plane of the predetermined cutting line and passes through the axis of symmetry and rotation of the corresponding glass piece 1.

The adjustment of the focusing of the beams of laser rays 154, 154' and 155, 155' during a marking step and during a heating step is carried out in the manner described above illustrated in FIGS. 3 to 6.

After the cracking-off of the four glass pieces 1 situated in front of the two marking and heating stations, the stepper drive system moves the four cracked-off glass pieces towards the cooling station 200, at the same time placing four new glass pieces to be cracked off in front of the two cracking-off stations 100, 100'.

The cooling station 200 is equipped with four moil detectors 201.

Each moil detector 201 checks whether the glass piece positioned in front of the moil detector 201 still includes its moil. Where the moil has not been detached from the glass piece, the glass piece, with its moil, is automatically ejected.

After the cooling of the glass pieces, the stepper drive system takes them to the flatting station 300, in which the cracked-off edge of the cracked-off glass pieces is flatted.

After the flatting of the edge of the cracked-off glass pieces, the stepper drive system brings the cracked-off glass pieces to the station 400 for bevelling the edge of the glass pieces.

After the bevelling of the edge of the cracked-off glass pieces, the drive system brings the cracked-off glass pieces to the washing and draining station 500.

After the washing and draining of the cracked-off glass pieces, the stepper drive system brings them to the drying station 600 and then to a flame-polishing station 700, which can advantageously include a toughening system for the edge of the cracked-off glass pieces.

EXAMPLE 1

The hollow glass articles are cracked off, by means of an installation of the type described above and shown schematically in FIGS. 3, 4, 5, 6 and 8, including a 250 watt laser source.

The article to be produced, made from soda-lime-silica glass, is of the type illustrated in FIG. 3, that is to say a stem glass, with a splayed shape (at approximately 45° with respect to the axis of symmetry) which, at the cracking-off line, has a diameter of 105 mm and a thickness of 1.2 mm. The article to be cracked off is fixed by the base of the stem in a track whose axis of rotation coincides with the axis of symmetry of the glass article, and is rotated at a speed of 250 rev/min.

The following processing cycle is applied to this rotating article:

marking of the article for 3 sec with the laser beam pulsed at 10 kHz (cycle ratio of 30%) focused on the surface of the article (at the predetermined cutting line);

movement of the focusing element (in less than 0.1 sec) so that the same laser beam has a diameter of 4 mm at the point where it touches the article;

heating of the annular zone (which straddles the predetermined cutting line) with this laser beam for 2 sec;

the cracking-off occurs.

The cracking-off obtained perfectly follows a plane parallel to the base of the article, by virtue of the guiding of the fracture by means of the prior mark.

EXAMPLE 2

By means of an installation similar to the one used in Example 1, but equipped with a 200 W laser source, a crystal article is cracked off. This crystal article, which has a side wall in the form of a cylinder with a diameter of 80 mm and which has a thickness of 2 mm at the cracking-off point, is covered with a reflective layer of lead oxide due to flame-polishing at the end of its formation.

This crystal article is rotated at a speed of rotation of 200 rev/min and subjected to the following processing cycle:

marking of the article for 1.5 sec with the laser beam pulsed at 5 kHz (cycle ratio of 50%) focused on the surface of the article (at the predetermined cutting line);

movement of the focusing lens (in less than 0.1 sec) so that the same laser beam has a diameter of 3 mm at the point where it touches the crystal article;

heating of the annular zone (which straddles the predetermined cutting line) with the laser beam for 3.5 sec;

new movement of the lens (in less than 0.1 sec) so that the beam is once again focused on the surface of the article;

marking of the article with the laser beam pulsed at 5 kHz (cycle ratio of 50%) focused on the cutting line;

cracking-off occurs.

The cracking-off is of good quality. From the processing cycle applied to the article, the first marking stage makes it possible to pierce the reflective lead oxide layer and improves the heating in depth. The final marking step causes cracking-off by causing a line of microfaults which generates the rupture.

EXAMPLE 3

By means of the same installation as the one used in Example 1, equipped with a 250 W laser source, a hollow glass article is cracked off.

The article to be produced (made from soda-lime-silica glass) has a side wall made from a cylindrical substance and a flat base, and its cross-section is a square with rounded corners. The mean diameter is 60 mm and the glass has a thickness of 2 mm at the cracking-off point.

The glass article, rotated about its longitudinal axis at a speed of rotation of 350 rev/min, is subjected to the following processing cycle:

heating of the annular zone which straddles the predetermined cutting line by means of the laser beam pulsed at 10 kHz (cycle ratio at 30%) for 3.5 sec. This beam is focused not on the surface of the article but on a point such that the diameter of the beam is approximately 4 mm at the point where it touches the article;

movement of the focusing lens (in less than 0.1 sec) so that the same beam coincides substantially with the surface of the article;

marking of the article for 0.5 sec with the laser beam pulsed at 10 kHz (cycle ratio of 5%) focused on the surface of the article;

cracking off occurs.

The cracking off obtained perfectly follows a plane parallel to the base of the article. The (final) marking step initiates the rupture by the introduction of microfaults on the predetermined cutting line.

The depth of field of the focusing element allows acceptable focusing on the surface of the article although it is not a surface of revolution.

It should be noted that, with the article processed in Example 3, the radius of the article (at the point of the cracking-off line) oscillates only by ±3 mm around the mean value of the radius.

In order to process articles which are not bodies of revolution and where the distance between the predetermined cutting line with respect to the axis deviates to a greater extent (for example by more than 5 mm) from a mean value, it may be advantageous or necessary to slave the position of the focusing element as a function of the shape of the article so as to keep the focal point of the beam on the surface of the article in rotation, during a marking step.

What is claimed is:

1. A method of processing a glass piece so as to cut the piece along a predetermined cutting line on its surface, the method including:

at least one marking step, during which a beam of laser rays focused by a focusing means travels along the predetermined cutting line, the beam being substantially focused on the predetermined cutting line, and at least one heating step, during which a beam of laser rays travels along the predetermined cutting line without being focused on this line, the portion of the surface irradiated by the laser beam straddling the predetermined cutting line, wherein, the same beam of laser rays travels along the predetermined cutting line during a marking step and during a heating step, the focusing means being an adjustable focusing means which, during a marking step, focuses the beam of laser rays substantially on the predetermined cutting line and which, during a heating step, ensures that the focal point of the beam is appreciably distant from the predetermined cutting line.

2. A method according to claim 1, wherein, during the marking step, the focused beam of laser rays travels along the predetermined cutting because the glass piece is moved in such a way that, at any moment, the predetermined cutting line coincides substantially with the focal point of the laser beam, and in that, during a heating step, the beam of laser rays travels along the predetermined cutting line, because the glass piece is moved in such a way that, at any moment, the portion of surface irradiated by the beam straddles the predetermined cutting line.

3. A method according to claim 1 or 2, wherein the focusing means comprises a convergent lens for lasers.

4. A method according to claim 3, wherein the adjustment of the focusing of the beam is effected by a movement of the lens along the axis of the beam.

5. A method according to claim 4, wherein the movement of the lens is caused and controlled by the movement of the axis of a linear electric motor.

6. A method according to claim 1 or claim 2, wherein the beam of laser rays projected onto the surface of the glass piece during a marking step is a pulsed beam of laser rays.

7. A method according to claim 6, wherein the pulsed beam of laser rays projected onto the surface of the glass piece during a marking step produces on this surface a succession of impact zones having a diameter of less than 500 $\mu$m separated from each other by a distance of less than 2 mm.

8. A method according to claim 7, wherein the impact zones (60) have a diameter of less than 100 $\mu$m.

9. A method according to claim 7, wherein the impact zones (60) have a diameter of less than 50 $\mu$m.

10. A method according to claim 7, wherein the impact zones (60) are separated from each other by a distance of less than 1 mm.

11. A method according to claim 7, wherein the impact zones (60) are separated from each other by a distance of between 100 $\mu$m and 800 $\mu$m.

12. A method according to claim 7, wherein the physical characteristics of the pulsed beam of laser rays are such that the impact zones are subjected to the action of die beam with a density of radiation which is sufficiently high for point defects, coinciding substantially with the predetermined cutting line, to appear on the surface of the glass piece.

13. A method according to claim 1 or 2, wherein the beam of laser rays projected onto the surface of the glass piece during a marking step is a continuous beam of laser rays.

14. A method according to claim 13, wherein the continuous beam of laser rays projected onto the surface of the glass piece during a marking step produces on this surface a continuous impact line with a width of less than 500 $\mu$m.

15. A method according to claim 14, wherein the continuous impact line has a width of less than 100 $\mu$m.

16. A method according to claim 14, wherein the continuous impact line has a width of less than 50 $\mu$m.

17. A method according to claim 14, wherein the physical characteristics of the continuous beam of laser rays projected onto the surface of the glass piece during a marking step are such that the continuous impact line is irradiated with a density of irradiation which is sufficiently high for a crack, coinciding substantially with the predetermined cutting line, to appear on the surface of the glass piece.

18. A method according to claim 1 or 2, wherein the beam of laser rays projected onto the surface of the glass piece during a hearing step is a continuous beam of laser rays.

19. A method according to claim 18, wherein the beam of laser rays projected onto the surface of the glass piece during a heating step produces on this surface an impact line having a width of between 2 mm and 10 mm.

20. A method according to claim 18, wherein the physical characteristics of the beam of laser rays projected onto the surface of the glass piece during a heating step and the irradiation conditions during this heating step are such that the portion of irradiated surface is subjected to a density of irradiation such that the geometry of the surface is not altered but the heating of the irradiated zone creates mechanical stresses in the mass of glass in this zone.

21. A method according to claim 1 or 2, wherein the beam of laser rays projected onto the surface of the glass piece during hearing is a pulsed beam of laser rays.

22. A method according to claim 1 or 2, wherein a marking step is followed by a heating step.

23. A method according to claim 1 or 2, wherein the method includes successively a marking step, a beating step and a marking step.

24. A method according to claim 1 or 2, wherein the method includes a heating step followed by a marking step.

25. A method according to claim 1 or 2, wherein the method includes successively a heating step, a marking step and a heating step.

26. A method according to claim 1 or 2, wherein the glass piece is a piece of hollow glass, the predetermined cutting line forming a closed curve.

27. A method according to claim 26, wherein the closed curve is situated in a plane, the piece of hollow glass being rotated about an axis perpendicular to this plane, during a marking step and during a heating step.

28. A method according to claim 1 or claim 2, wherein the glass piece is a flat glass piece.

29. An installation for processing a glass piece so as to cut the piece along a predetermined cutting line on the surface of the piece, the installation including:

a source for a beam of laser rays;

a system for guidance of the beam including a focusing means; and a device able to hold the glass piece to be processed, the installation being able to project onto the surface of the piece;

in at least one marking step, a beam of laser rays travelling along the predetermined cutting line, the beam of laser rays being substantially focussed on the predetermined cutting line by the focusing means, in at least one heating step, a beam of laser rays travelling alone the predetermined cutting line, the beam of laser rays not being focused on the cutting line, the portion of the surface irradiated by the beam of laser rays straddling the cutting line, wherein the focusing means is an adjustable focusing means able to focus a beam of laser rays emitted by the source of laser rays on the predetermined cutting line during a marking step, and able to ensure that the focal point of the same beam of laser rays projected onto the predetermined cutting line is appreciably distant from this line during a heating step.

30. An installation according to claim 29, wherein the device able to hold the glass piece is a movable device able to move the glass piece.

31. An installation according to claim 29, wherein the device able to hold the glass piece is able to move the glass piece in a plane perpendicular to the axis of the beam of laser rays.

32. An installation according to claim 29, wherein the device able to hold the glass piece is able to rotate the glass piece.

33. An installation according to claim 32, wherein the device able to hold the glass piece is able to rotate the glass piece about an axis (A—A) perpendicular to the axis of the beam of laser rays.

34. An installation according to claim 29, including multiple devices able to hold the glass piece so as to constitute a transfer line able to hold a multitude of glass pieces.

35. An installation according to claim 34, wherein the transfer line is a stepper drive device.

36. An installation according to claim 29, wherein the transfer line is adapted for rotating hollow glass pieces.

* * * * *